US010718906B2

(12) United States Patent
Lin

(10) Patent No.: US 10,718,906 B2
(45) Date of Patent: Jul. 21, 2020

(54) OPTICAL DEVICE USING WAVEGUIDE SEGMENTS TAPERED ACCORDING TO A NON-LINEAR FUNCTION

(71) Applicant: Intel Corporation, Santa Clara, CA (US)

(72) Inventor: Wenhua Lin, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/235,848

(22) Filed: Dec. 28, 2018

(65) Prior Publication Data

US 2019/0137691 A1    May 9, 2019

(51) Int. Cl.
*G02B 6/293* (2006.01)
*G02B 6/122* (2006.01)
*G02B 6/12* (2006.01)
*G02F 1/365* (2006.01)
*G02B 6/124* (2006.01)

(52) U.S. Cl.
CPC ........... *G02B 6/2938* (2013.01); *G02B 6/124* (2013.01); *G02B 6/12007* (2013.01); *G02B 6/1225* (2013.01); *G02B 6/1228* (2013.01); *G02B 6/29316* (2013.01); *G02F 1/365* (2013.01); *G02B 2006/12104* (2013.01); *G02B 2006/12107* (2013.01)

(58) Field of Classification Search
CPC .............. G02B 6/2938; G02B 6/12007; G02B 6/1225; G02B 6/1228; G02B 6/124; G02B 6/29316; G02B 2006/12104; G02B 2006/12107; G02F 1/365
USPC .......................................................... 385/37
See application file for complete search history.

(56) References Cited

U.S. PATENT DOCUMENTS

| 9,250,388 B1* | 2/2016 | Krishnamurthi | ..... G02B 6/2938 |
| 2002/0176665 A1* | 11/2002 | Missey | .............. G02B 6/12016 385/37 |
| 2017/0256277 A1* | 9/2017 | Peng | .................... G11B 5/4866 |

* cited by examiner

*Primary Examiner* — Jerry M Blevins
(74) *Attorney, Agent, or Firm* — Schwabe, Williamson & Wyatt, P.C.

(57) ABSTRACT

Embodiments of the present disclosure are directed toward techniques and configurations for an optical device having a multiplexer and/or demultiplexer with an input and/or output optical waveguide including one or more waveguide segments tapered according to a non-linear function such as a curve. In embodiments, the one or more waveguide segments is tapered according to, e.g., a quadratic function, a parabolic function, or an exponential function. In accordance with some embodiments, the tapered segment assists in spatially dispersing the propagating light along a substantially uniform phase wavefront at a mirror that includes an echelle grating surface that is shaped to receive/reflect the light at the substantially uniform phase wavefront. In embodiments, the one or more waveguide segments is tapered according to a curve to receive a portion of light from the substantially uniform phase wavefront at the echelle grating surface. Additional embodiments may be described and claimed.

19 Claims, 8 Drawing Sheets

Linear + Linear

Quadratic + Linear (Linear segment is optional)

Parabolic + Linear (Linear segment is optional)

Exponential + Linear (Linear segment is optional)

Quadratic + Parabolic + Linear
(Linear segment is optional)

Parabolic + Exponential + Linear
(Linear segment is optional)

Quadratic + Linear
(Linear segment is optional)

OPTICAL DEVICE USING WAVEGUIDE SEGMENTS TAPERED ACCORDING TO A NON-LINEAR FUNCTION

FIELD

Embodiments of the present disclosure generally relate to the field of optoelectronics, and more particularly, to techniques and configurations for an optical device (e.g., multiplexer or demultiplexer) using echelle gratings and implemented on a silicon-on-insulator platform.

BACKGROUND

Optical multiplex or demultiplex devices based on echelle grating techniques have been used to realize multiplexing or demultiplexing of optical signals. Several approaches may be implemented to increase reflectivity of the grating surface in such devices and accordingly reduce optical loss. In some cases, due to large incidence angles of light received from input waveguides, which are sometimes greater than total internal reflection (TIR) angles (~26° in a silicon platform), it can be a challenge to design a device that achieves a substantially uniform phase wavefront in the slab region across from the echelle grating. A non-uniform phase wavefront along the echelle grating can result in phase aberrations from the echelle grating surface, resulting in low grating efficiency, excess loss, and reduced figure-of-merit (FOM) of the echelle grating. For an echelle grating based optical multiplexer (Mux) and demultiplexer (Demux), phase aberrations may induce higher device loss, reduced filter passband and unwanted channel crosstalk, especially during Demux.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Figure 1:
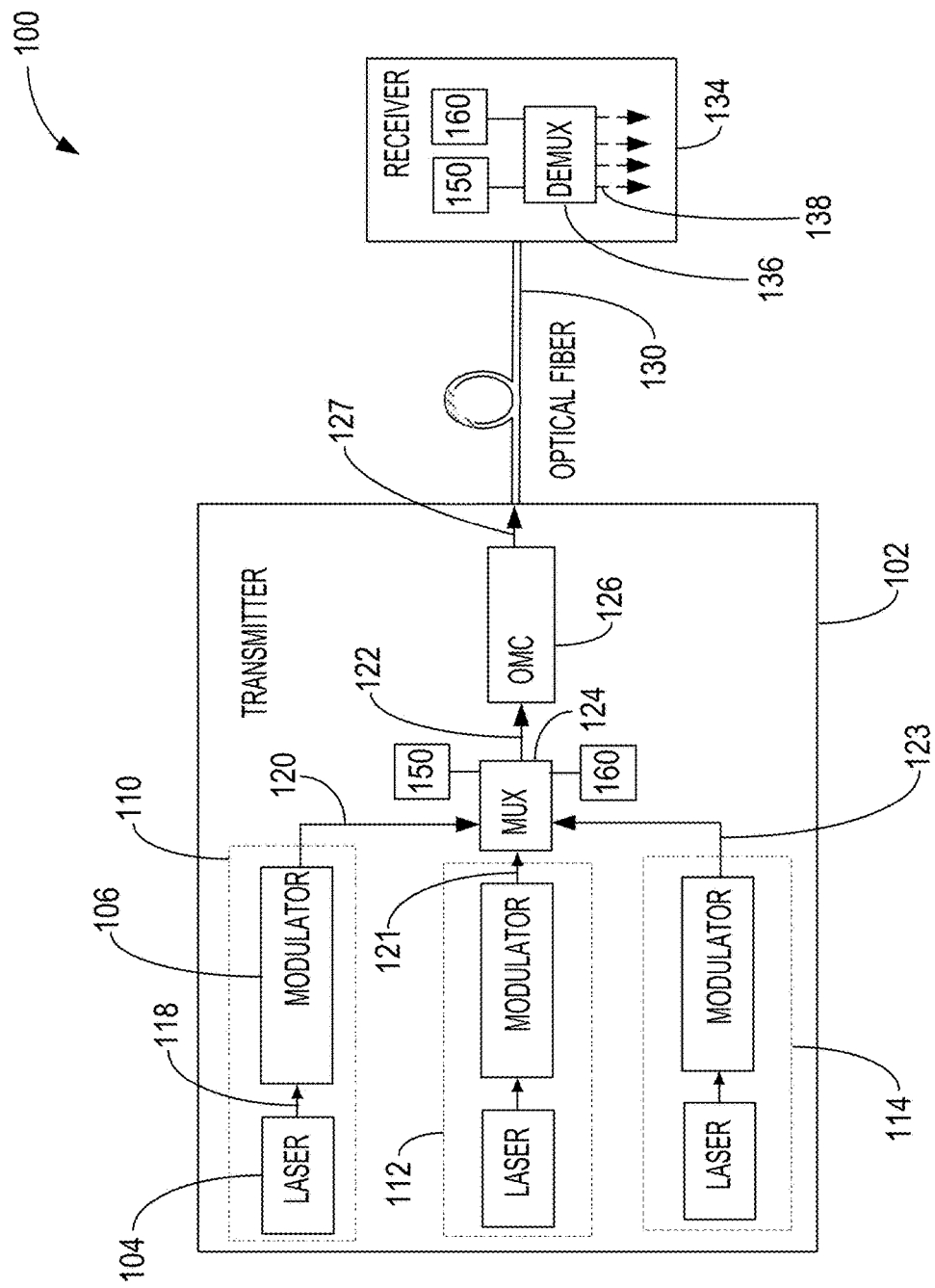
FIG. 1 is a block diagram of an optoelectronic system that includes a multiplexer and/or demultiplexer with an input optical waveguide and/or an output optical waveguide having at least one waveguide segment tapered according to a non-linear function and a mirror with echelle grating surface, in accordance with some embodiments.

Embodiments of the present disclosure describe techniques and configurations for an optical device including an input optical waveguide and/or an output optical waveguide that includes one or more waveguide segments tapered according to a curve or non-linear function. In embodiments, an input optical waveguide spatially disperses the propagating light along a substantially uniform phase wavefront at an echelle grating reflective surface of a mirror. In embodiments, an output optical waveguide receives a portion of light from the substantially uniform phase wavefront reflected from the echelle grating reflective surface of the mirror. In embodiments, the one or more waveguide segments tapered according to the curve includes one or more waveguide segments tapered according to a quadratic function, a parabolic function, or an exponential function. In embodiments, the one or more waveguide segments includes multiple waveguide segments that include a first and a second consecutive segment and the first and/or the second segment is tapered according to a quadratic, parabolic, exponential, and linear function. In embodiments, the optical device may comprise a multiplexer or a demultiplexer.

In the following description, various aspects of the illustrative implementations will be described using terms commonly employed by those skilled in the art to convey the substance of their work to others skilled in the art. However, it will be apparent to those skilled in the art that embodiments of the present disclosure may be practiced with only some of the described aspects. For purposes of explanation, specific numbers, materials, and configurations are set forth in order to provide a thorough understanding of the illustrative implementations. However, it will be apparent to one skilled in the art that embodiments of the present disclosure may be practiced without the specific details. In other instances, well-known features are omitted or simplified in order not to obscure the illustrative implementations.

In the following detailed description, reference is made to the accompanying drawings that form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or more elements are in direct contact.

As used herein, the term "module" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable components that provide the described functionality.

FIG. 1 is a block diagram of an optoelectronic system 100 that may include a multiplexer and/or demultiplexer with an input and/or output optical waveguide including one or more waveguide segments tapered according to a non-linear function such as a curve, according to embodiments. In embodiments, the one or more waveguide segments tapered according to the curve includes one or more waveguide segments tapered according to a quadratic function, a parabolic function, or an exponential function. In accordance with some embodiments, the one or more waveguide segments assists an input optical waveguide in spatially dispersing the propagating light along a substantially uniform phase wavefront at a mirror that includes an echelle grating reflective surface. Accordingly, in embodiments, an output optical waveguide receives a portion of light from the substantially uniform phase wavefront reflected and focused from the echelle grating reflective surface to be received at one or more waveguide segments tapered according to a curve. The optoelectronic system 100 may be used to transmit an optical signal modulated with a data signal via an optical fiber, for example, between racks in a data center, or long distance, between data storage facilities, data centers, and the like.

The optoelectronic system 100 may include an optical device such as transmitter 102 (e.g., photonic chip). The transmitter 102 may include one or more light sources (e.g., laser devices) 104 to provide a light signal 118 (e.g., constant light intensity signal) to a respective modulator 106 to modulate input light according to a data signal to be transmitted. Each combination of the light source 104 and corresponding modulator 106 may comprise a communication channel 110, 112, 114. Although three communication channels are shown, fewer or multiple more communication channels may be used in a transmitter such as 102, e.g., to provide a desired data transmission rate. The modulator 106 may output a modulated optical signal 120 to a multiplexer 124 having a mirror 150 with an echelle grating including grating grooves to correspond to an input optical waveguide and/or an output optical waveguide 160, where the input optical waveguide and/or output optical waveguide 160 has at least one or more waveguide segments tapered according to the curve to propagate light to/from a substantially uniform phase wavefront at the echelle grating reflective surface, as described herein. Similarly, communication channels 112, 114 may output modulated signals 121, 123 to the multiplexer 124. Signals 120, 121, 123 multiplexed from communication channels 110, 112, and 114 may be input as a combined signal 122 to an optical mode converter (e.g., coupler) 126.

The optical mode converter 126 may provide the interface from the multiplexer 124 on the photonic chip to an optical communication channel (e.g., optical fiber cable) 130 and is configured to transfer the combined optical signal 127 to the optical communication channel 130, to be received by a receiver 134. In embodiments, the receiver 134 may include a demultiplexer 136 having the mirror 150 with an echelle grating and an input optical waveguide and/or an output optical waveguide 160, as described herein. In some embodiments, the echelle grating provides a substantially total internal reflection of light. The demultiplexer 136 may be configured to demultiplex signal 127 into multiple signals 138, according to techniques described herein.

Figure 2:
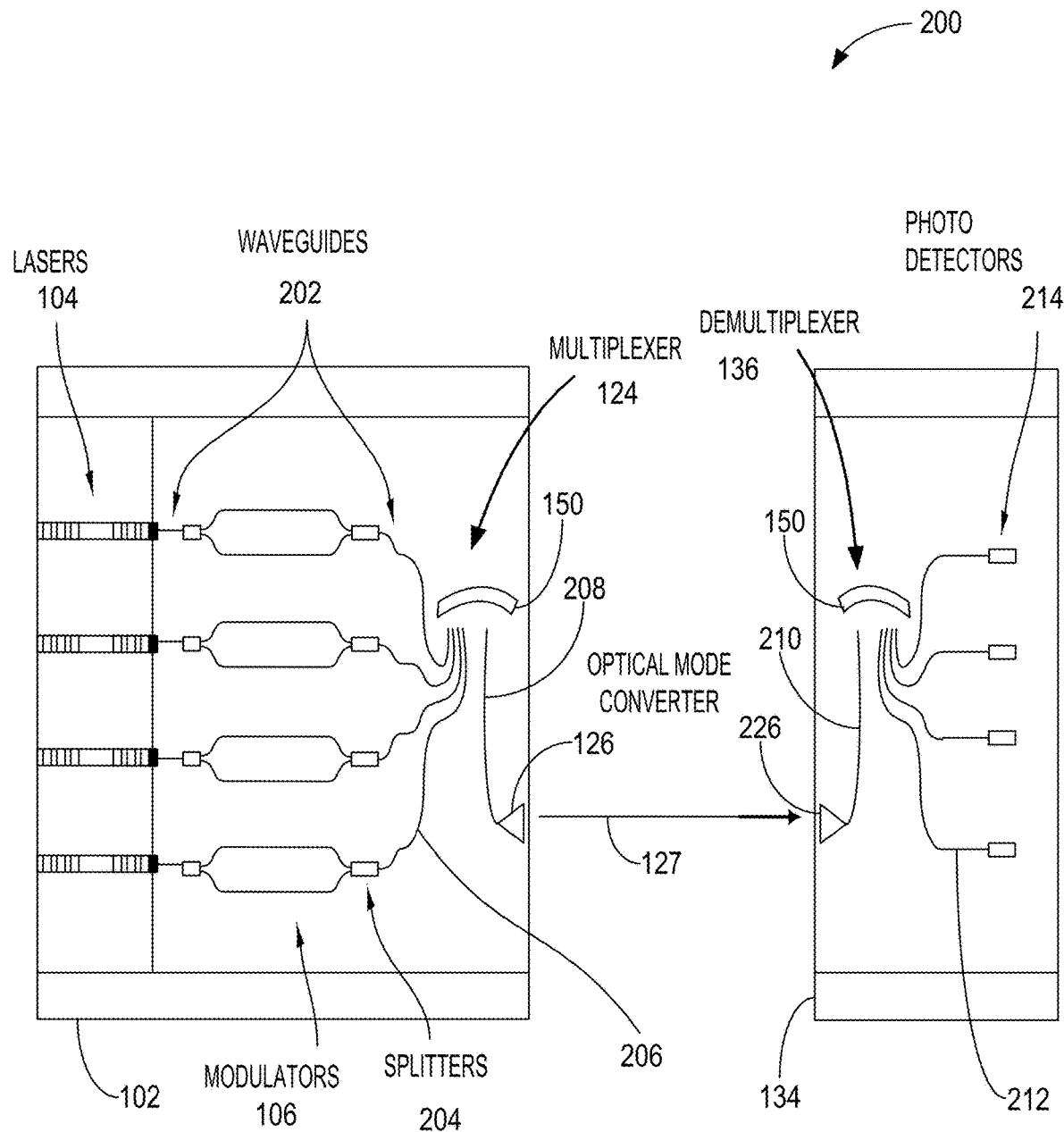
FIG. 2 is an example implementation of the optoelectronic system as an integrated photonics link, in accordance with some embodiments.

FIG. 2 is an example implementation of the optoelectronic system of FIG. 1 as an integrated photonics link 200, in accordance with some embodiments. Similar to the system 100 described above, the link 200 may include a transmitter 102 and receiver 134. The transmitter 102 may include multiple lasers 104 and waveguides 202 comprising modulators 106 and splitters 204. The optical signals generated by the lasers 104 may be provided through the waveguides 202 and splitters 204 to the mirror 150 of the multiplexer 124 with multiple input optical waveguides ("input waveguide(s)") 206, according to wavelengths of each of the input waveguides 206. In embodiments, one or more input waveguides 206 includes one or more waveguide segments tapered according to a curve or non-linear function as described herein. In some embodiments, the mirror 150 may substantially totally reflect the optical signals of different wavelengths and combine the signals due to the echelle grating effect of the mirror. An output optical waveguide ("output waveguide(s)") 208 may receive the combined optical signal and transmit the optical signal to the optical mode converter 126. In embodiments, one or more output waveguides 208 includes one or more waveguide segments tapered according to a curve or non-linear function as described herein.

The optical mode converter 126 may provide the optical signal 127 converted from the combined optical signal to the receiver 134, to be converted by an optical mode converter 226 of the receiver 134. The converted optical signal may then be input into the demultiplexer 136 with the mirror 150 via an input optical waveguide 210. In some embodiments, the mirror 150 may substantially totally reflect the optical signal, which may be split by wavelengths due to echelle grating effect of the mirror 150. The split portions of the signal may be received by multiple output optical waveguides 212 according to corresponding wavelengths of the waveguides 212. In embodiments, one or more of input optical waveguide 210 or output optical waveguides 212 includes one or more waveguide segments tapered according to a curve or non-linear function as described herein. The portions of the output signal may be provided via the output waveguides 212 to photodetectors 214, to be further processed as desired. According to various embodiments, input optical waveguide 206, 210 and the output optical waveguide 208, 212 comprise one or more of a rib waveguide, strip waveguide, or a channel waveguide structure. Input optical waveguide 206, 210 and output optical waveguide 208, 212 may comprise the similar or same element as input optical waveguide and/or output optical waveguides 160 of FIG. 1.

Figure 3:
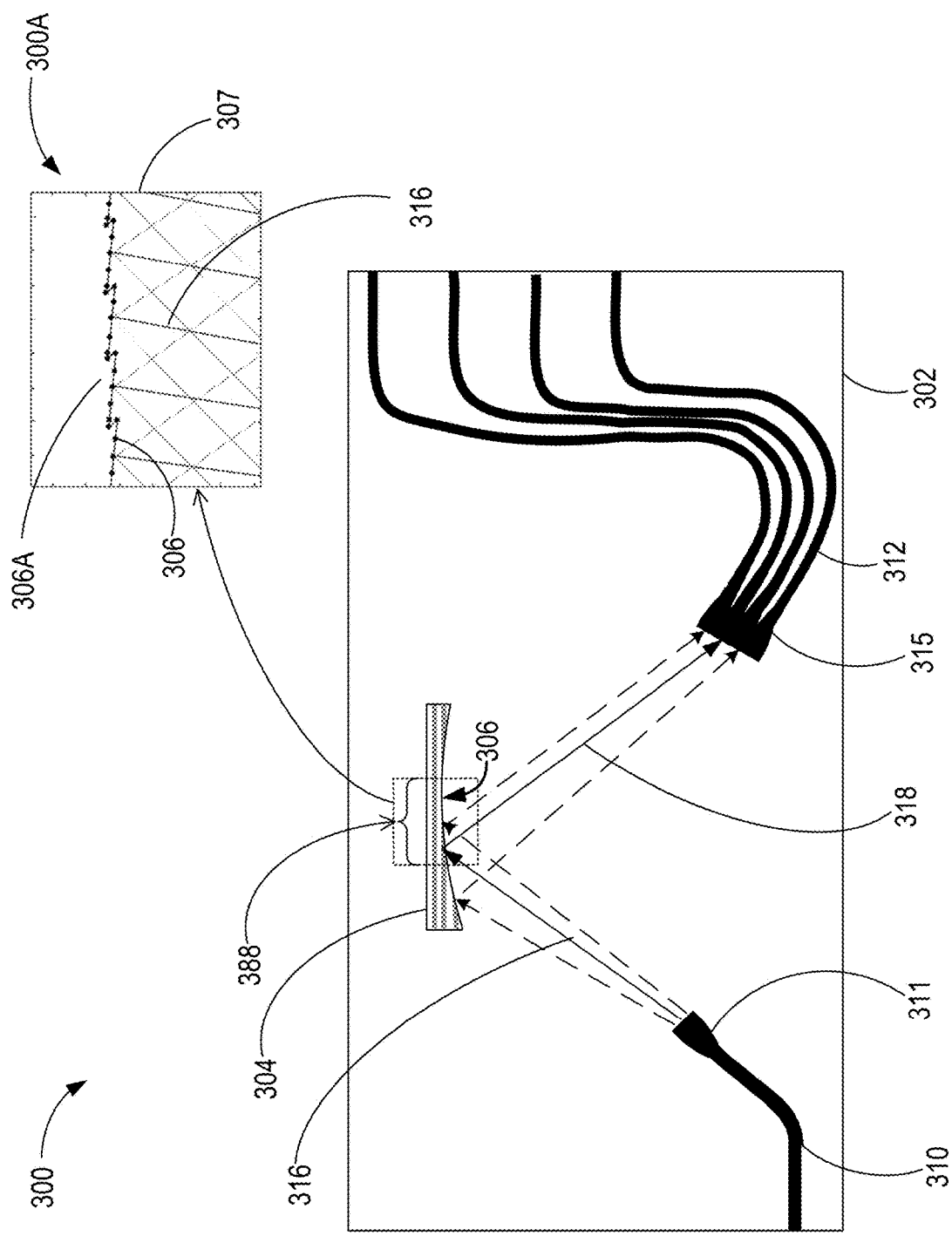
FIG. 3 illustrates an example top view of an optical device including an input optical waveguide and/or an output optical waveguide having a waveguide segment tapered according to a non-linear function and a mirror with echelle grating surface, in accordance with some embodiments.

FIG. 3 illustrates an example top view of an optical device 300 including an input optical waveguide and an output optical waveguide (e.g., as included in the optoelectronic systems of FIGS. 1 and 2), each including one or more waveguide segments tapered according to a curve or non-linear function. In embodiments, optical device 300 includes a mirror 304 that includes an echelle grating reflective surface 306 (also "reflective surface 306") to receive light 316 from an input optical waveguide 310 ("input waveguide 310") dispersed along a substantially uniform phase wavefront 307.

Accordingly, in embodiments, when light, e.g., a portion of light, e.g., indicated at light 316, enters semiconductor layer 302 from input waveguide 310 having one or more waveguide segments 311 tapered according to a curve or non-linear function ("tapered segment 311"), it propagates within the silicon slab region, until spatially dispersed along a substantially uniform phase wavefront 307 of reflective surface 306. In embodiments, one or more output optical waveguides 312 ("output waveguide(s) 312") receives a portion of light, e.g., light beam 318, reflected from substantially uniform phase wavefront 307 at reflective surface 306. In embodiments, the portion of light 318 is received at a focus point (not shown) associated with a waveguide segment 315 tapered according to a curve or non-linear function ("tapered segment 315"). In embodiments, the one or more waveguide segments 311 and 315 are tapered according to a quadratic function, a parabolic function, or an exponential function. Note that for clarity in the FIGS., only light beam 316 and 318 are labeled.

In embodiments, the one or more waveguide segments are tapered according to the curve or non-linear function to achieve substantially uniform phase wavefront 307 along a corresponding blazed grating groove zone 388, including grating teeth or grating grooves, e.g., 306A shown in window 300A of FIG. 3. According to various embodiments, reflective surface 306 may comprise a plurality of linear or curved micro-mirrors to form grating grooves 306A to provide constructive interference to receive and/or reflect light at substantially uniform phase wavefront 307. In embodiments, grating grooves 306A may be constructed using various focusing geometries such as a Roland circle or ellipse. For example, in a Roland circle, micro-mirror centers may be located about the circumference of a circle. In an elliptical disposition, micro-mirror centers may be determined based on the grating equation.

In embodiments, grating grooves 306A are arranged to, in conjunction with the one or more waveguide segments 311, form a beam path length (e.g., 316) consistent with receiving the propagating light along substantially uniform phase wavefront 307. Accordingly, in embodiments, grating grooves 306A are arranged to, in conjunction with tapered waveguide segment 315, form a beam path length (e.g., also represented by light 318) consistent with reflecting the propagating light from phase wavefront 307 to focus the propagating light at an output focus point associated with output waveguide 312.

Note that although in FIG. 3, each of input waveguide 310 and output waveguide 312 are shown as including one or more waveguide segments 311 and 315, tapered according to a curve or non-linear function, it is understood that embodiments may include optical devices where, e.g., only one input or one output includes one or more waveguide segments 311 and 315, tapered according to a curve or non-linear function. Furthermore, it will be appreciated that a multiplexer such as 124 or demultiplexer such as 136 may be implemented according to the embodiments described in reference to FIG. 3. For simplicity purposes, the optical device illustrated in FIG. 3 comprises a demultiplexer. Furthermore, depending on the optical device, the terms "input optical waveguide" and "output optical waveguide" may be interchangeable.

Figure 4:
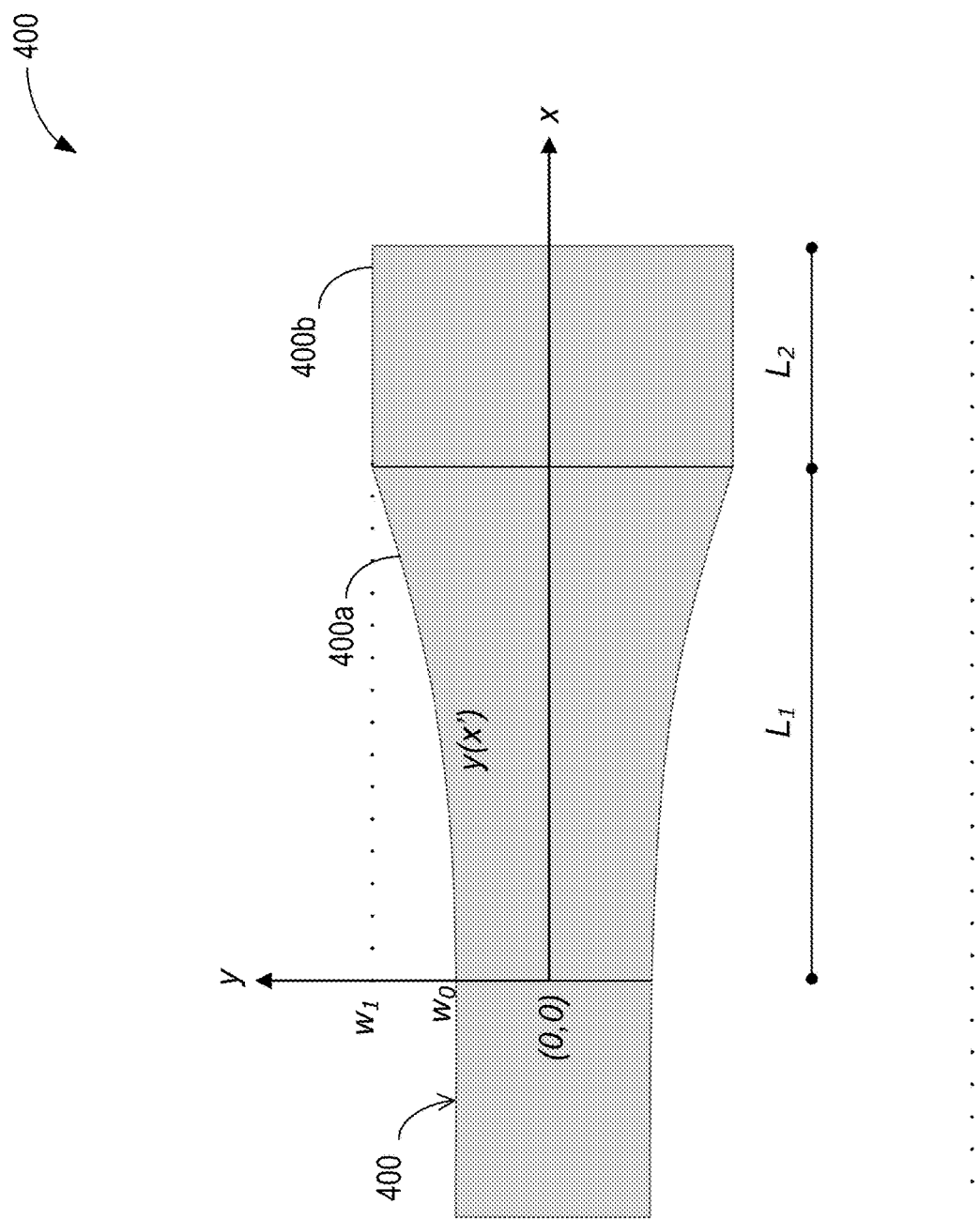
FIGS. 4-11 illustrate side views of example input optical waveguides and/or output optical waveguides, in accordance with some embodiments.

FIG. 4 is an example side view of a portion 400 of an optical waveguide that includes one or more waveguide segments 400a and 400b, where one or more waveguide segments are tapered according to a curve. In embodiments, the one or more waveguide segments are tapered to respectively, spatially disperse the propagating light along a substantially uniform phase wavefront at a mirror, e.g., mirror 304, that includes an echelle grating reflective surface, and to receive a portion of light from a substantially uniform phase wavefront reflected from the echelle grating reflective surface. As shown, waveguide segment 400a has a length $L_1$ and waveguide segment 400b has a length $L_2$.

In embodiments, waveguide segment 400a is tapered according to a non-linear taper function, e.g., a quadratic function, while waveguide segment 400b is a straight waveguide segment tapered according to a linear function. To further illustrate, a simple taper width function is defined as:

$$w(x')=w_0+(w_1-w_0)y(x')$$

where w(x') represents the function according to which the waveguide segment is to be tapered ("taper width function"), and $w_0$ and $w_1$ represent the respective widths at the starting and ending points of the relevant waveguide segment. For illustrative purposes, x' is a normalized coordinate to a total length $L_1$ of tapered waveguide segment (e.g., 400a) along the x-axis and is defined as:

$$x' = \frac{x}{L_1}$$

For example, in embodiments, taper width functions are set as a combination of, e.g., the below choices of functions:

Linear: $f(x')=x'$

Quadratic: $f(x')=x'^2$

Parabolic: $f(x')=1-x'^2 0 \le x' \le 1$

Exponential: $f(x')=x'^{e^{x'}}$

In embodiments, a total length (e.g., L1+L2) may be substantially shorter, such as, e.g., a 50% length reduction, than a total length of conventional waveguide segments used to achieve reflection along a substantially uniform phase wavefront at grating grooves curves, e.g., grating grooves 306A of FIG. 3. Note that in some embodiments, a taper length (e.g., L1+L2 or L1 or L2, alone) of one or more waveguide segments have a measurement of between 10 and 200 micrometers. In embodiments, the grating grooves are arranged according to a Rowland or elliptical grating configuration. In embodiments, this may be especially true for echelle grating surfaces providing large angle or total internal reflection (TIR) of light, as further discussed with respect to FIG. 12.

Figure 5:
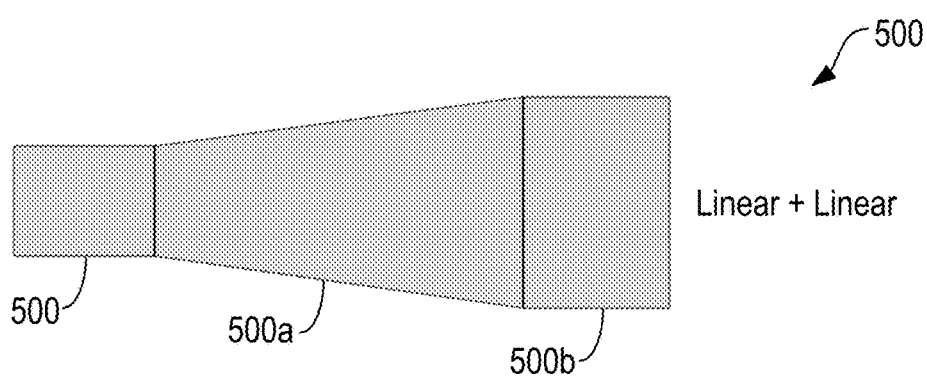
Figure 9:
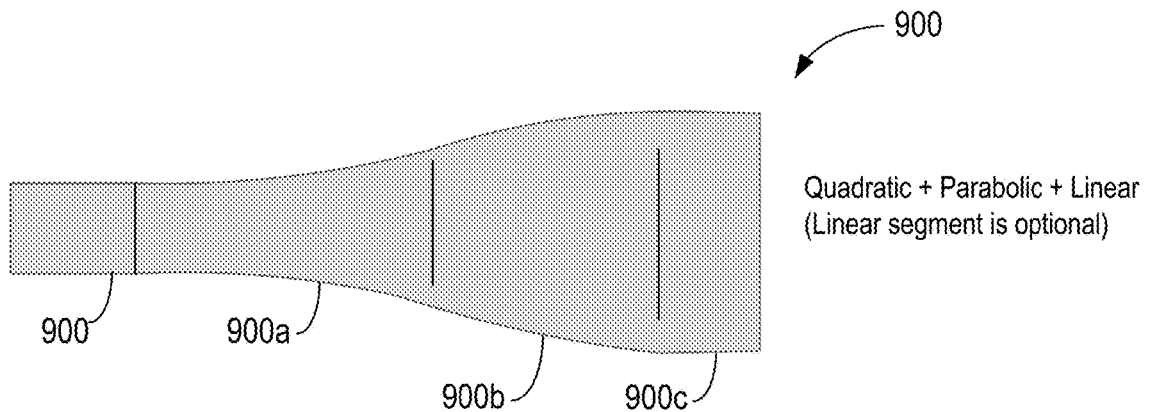
Figure 10:
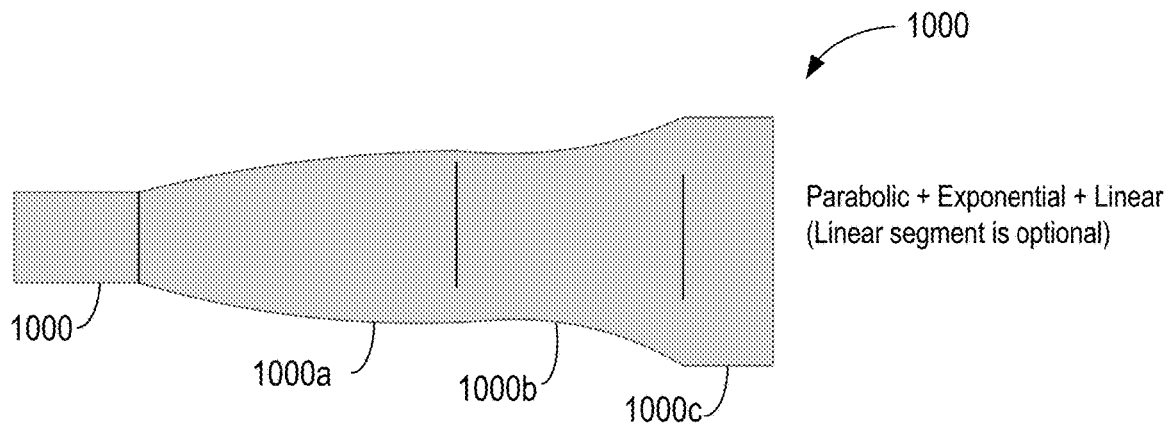
Figure 11:
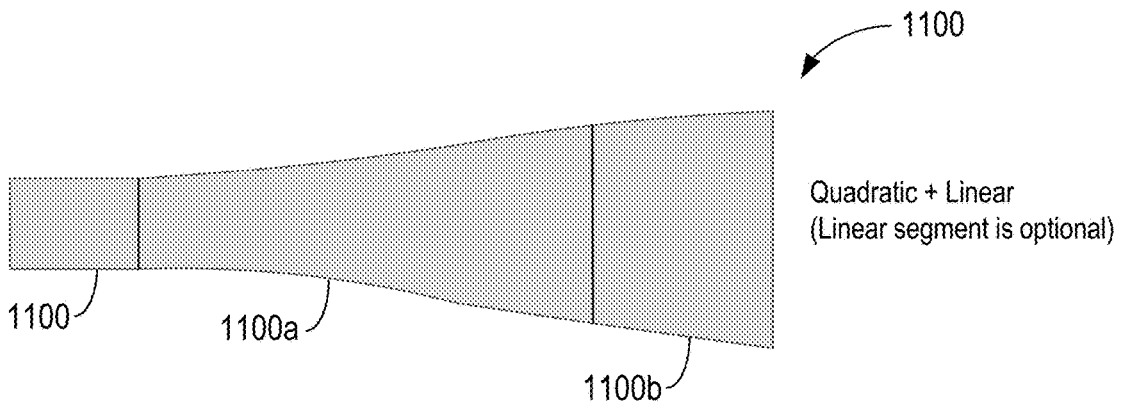

FIG. 5 includes a portion 500 of an optical waveguide including consecutive waveguide segments 500a and 500b, each tapered according to linear functions. FIGS. 6-8 and FIGS. 9-11 are side views of portions of optical waveguides that, in embodiments, include one or more example waveguide segments constructed or shaped according to a quadratic function, a parabolic function, an exponential function, and/or a linear function. In some embodiments, the waveguide segment tapered according to a curve is proximate to or followed a waveguide segment tapered according to a linear function (also "straight waveguide section"). Note that in embodiments, the straight waveguide section is optional. FIGS. 9-11 illustrate side views of portions of optical waveguides where one or more waveguide segments having a non-linear or curved function are combined with a next consecutive waveguide segment in a manner to form a smooth transition between two segments.

Note that the order, number, and particular combination of the individual waveguide segments shown in FIGS. 6-8 and 9-11 are merely example embodiments. Any suitable combination of the one or more waveguide segments shown in FIGS. 6-8 and 9-11 as well as additional shapes (e.g., horn shape, or variations of a horn or other shape), non-linear, or linear function, that may assist an input optical waveguide to spatially disperse light along a substantially uniform phase wavefront at an echelle grating reflective surface of a mirror or receive the reflected light from the substantially uniform phase wavefront from the echelle grating reflective surface of the mirror that reduces a conventional taper length, is contemplated. The example portions of the optical waveguides may represent portions of an input waveguide or output waveguide (see, e.g., 311 or 312 in FIG. 3), in embodiments.

For illustrative purposes, FIG. 5 includes a portion of an optical waveguide 500 including consecutive waveguide segments 500a and 500b, both tapered according to linear functions. Note that using optical waveguides that include one or more segments shaped according to a non-linear or curved function as shown in FIG. 4 and FIGS. 6-11 may reduce a taper length significantly as compared to an input or output waveguide including only segments shaped according to a linear function, e.g., 50% reduction in taper length and, e.g., 25% reduction in chip length or 30% reduction in chip area.

Figure 6:
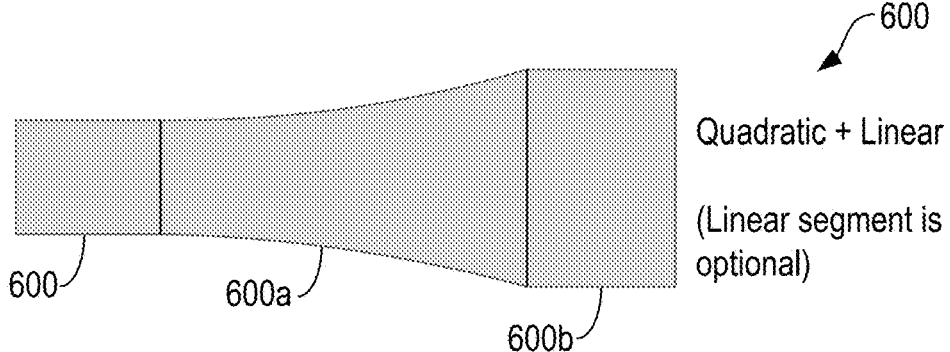

Accordingly, FIG. 6 is a side view of a portion of an optical waveguide 600 including embodiments including consecutive waveguide segments 600a and 600b. In embodiments, waveguide segment 600a is tapered according to a quadratic function (e.g., similar to FIG. 4) and waveguide segment 600b is tapered according to a linear function.

Figure 7:
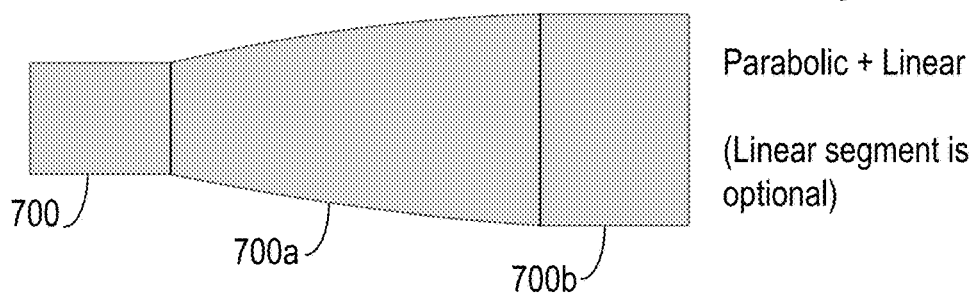

FIG. 7 is a side view of a portion of an optical waveguide 700 including consecutive waveguide segments 700a and 700b. In embodiments, waveguide segment 700a is tapered according to a parabolic function and waveguide segment 700b is tapered according to a linear function.

Figure 8:
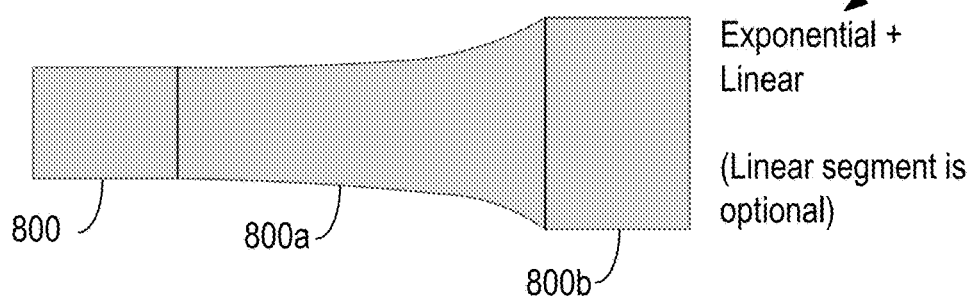

FIG. 8 is a side view of a portion of an optical waveguide 800 including consecutive waveguide segments 800a and 800b. In embodiments, waveguide segment 800a is tapered according to an exponential function and waveguide segment 800b is tapered according to a linear function.

FIGS. 9-11 are side views of portions of optical waveguides that include multiple example waveguide segments constructed or shaped according to a quadratic function, a parabolic function, an exponential function, and/or a linear function. In various embodiments, the example waveguide segments include a combination of one or more of the aforementioned functions. As with FIGS. 6-8, the example portions of the optical waveguides may represent an ending or beginning portion (see, e.g., 311 or 312 in FIG. 3) of an input waveguide or output waveguide, in embodiments.

For example, FIG. 9 is a side view of a portion of an optical waveguide 900 that includes consecutive waveguide segments shaped according to a combination of, e.g., the taper functions as discussed above. According to the embodiment, portion of optical waveguide 900 includes consecutive waveguide segments 900a, 900b, and 900c. In embodiments, waveguide segment 900a is tapered according to a quadratic function, waveguide segment 900b is tapered according to a parabolic function, and waveguide segment 900c is tapered according to a linear function. In embodiments, waveguide segment 900c tapered according to the linear function is optional.

FIG. 10 is a side view of a portion of an optical waveguide 1000 that includes consecutive waveguide segments shaped according to another combination of the taper functions as discussed in connection with FIG. 4. According to the embodiment, optical waveguide 1000 includes consecutive waveguide segments 1000a, 1000b, and 1000c. In embodiments, waveguide segment 1000a is tapered according to a parabolic function, waveguide segment 1000b is tapered according to an exponential function, and waveguide segment 1000c is tapered according to a linear function. In embodiments, waveguide segment 1000c tapered according to the linear function is optional and in embodiments, the optical waveguide may simply end with waveguide segment 1000b if an input waveguide or begin with waveguide segment 1000b in the case of an output waveguide.

FIG. 11 is a side view of a portion of an optical waveguide 1100 that includes consecutive waveguide segments shaped according to another combination of the taper functions as discussed with respect to FIG. 4. According to the embodiment, the portion of optical waveguide 1100 includes consecutive waveguide segments 1100a and 1100b. In embodiments, waveguide segment 1100a is tapered according to a quadratic function and waveguide segment 1100b is tapered according to a linear function. In some embodiments, waveguide segment 1100b tapered according to a linear function is optional and optical waveguide 1100 ends or begins with waveguide segment 1100a.

Figure 12:
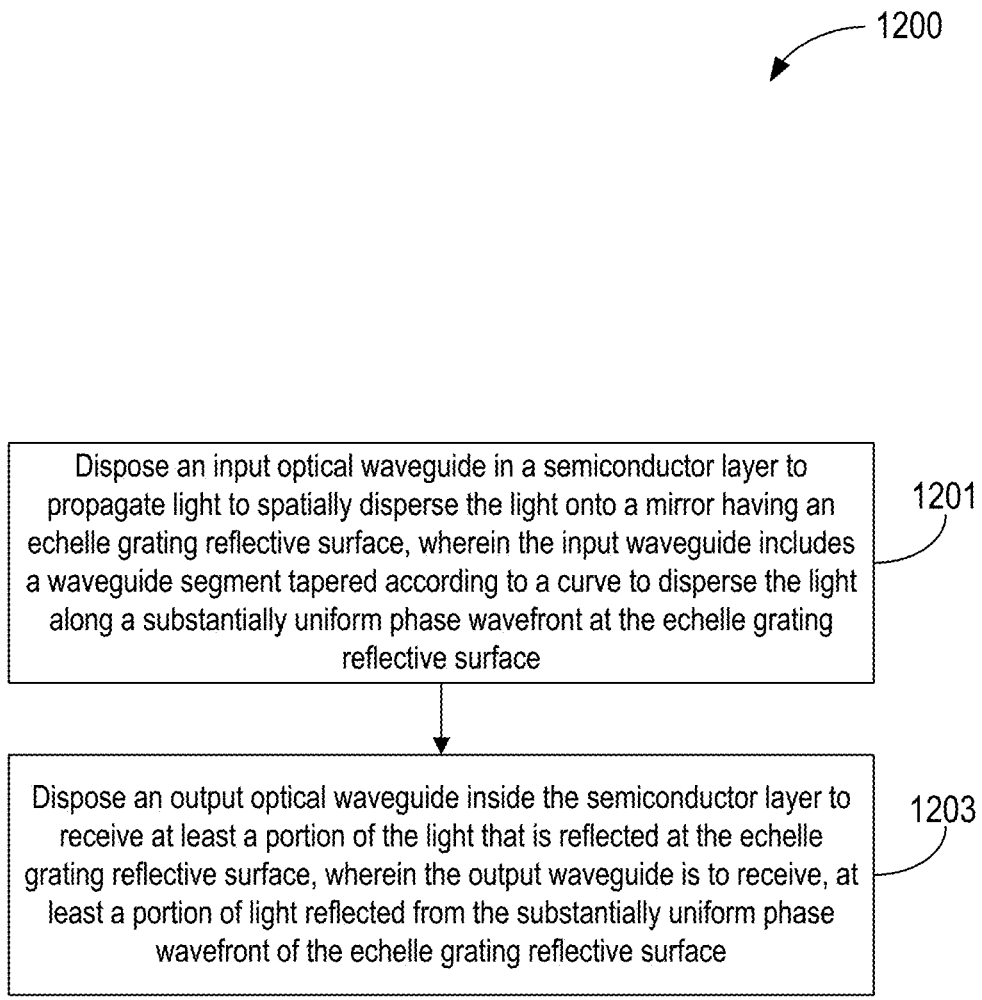
FIG. 12 is a flow diagram illustrating a method that depicts an embodiment associated with providing optical devices associated with FIGS. 1-11, in accordance with some embodiments.

FIG. 12 is a flow diagram illustrating a method 1200 that depicts an embodiment associated with providing an optical device including an input (or output) optical waveguide that includes one or more waveguide segments tapered according to a curve or a non-linear function and a mirror to receive or reflect light to and/or from the input (or output) optical waveguide at a substantially uniform phase wavefront. Method 1200 may be practiced with the optoelectronic systems of FIGS. 1-3 and input (or output) optical waveguides of FIGS. 4-11. In embodiments, method 1200 includes to, at a first block 1201, dispose an input optical waveguide in a semiconductor layer to propagate light to spatially disperse the light onto a mirror having an echelle grating reflective surface. In embodiments, the input waveguide includes at least one waveguide segment tapered according to a curve to disperse the light along a substantially uniform phase wavefront at the echelle grating reflective surface. In embodiments, at least one waveguide segment includes one or more waveguide segments tapered according to a quadratic function, a parabolic function, or an exponential function. In some embodiments, the waveguide segment tapered according to the curve is proximate to or followed by at least one waveguide segment tapered according to a linear function.

At a next block 1203, method 1200 may include, in embodiments, to dispose an output optical waveguide inside the semiconductor layer to receive at least a portion of the light that is reflected at the echelle grating reflective surface. In embodiments, the output waveguide is to receive at least a portion of light reflected from the substantially uniform phase wavefront of the echelle grating reflective surface. In embodiments, the output waveguide may also include at least one waveguide segment tapered according to a quadratic function, a parabolic function, or an exponential function. In embodiments, the method may further comprise providing a mirror with an echelle grating reflective surface that includes grating grooves arranged according to an elliptical or Roland circle focusing geometry, to match and/or correspond to the respective input waveguide and/or output waveguide to receive and/or reflect the propagating light at a substantially uniform phase wavefront.

Note that in embodiments, once one or more of the input or output waveguide of block 1201 or 1203 is tapered to achieve a substantially uniform phase wavefront along a corresponding grating groove zone (e.g., 388 of FIG. 3), beam path lengths may be determined to form a desired or consistent interference path length of each light beam at a corresponding grating tooth (e.g., 306A of FIG. 3), based on the grating equation. For example, when light enters from one or more input waveguide(s), it is spatially dispersed within the silicon slab region, then in various embodiments, totally reflected from the echelle grating surface and finally refocused at the output waveguide. For total internal reflection (TIR) echelle gratings, the echelle grating is defined such that the light incident angle on the echelle grating is larger than the critical angle required for total internal reflection. Since the angle of reflection is always equal to the angle of incidence, the location and orientation of output waveguides is determined by the grating equation:

$$D_g(\sin\theta_i + \sin\theta_d) = m\frac{\lambda}{n_{\text{eff}}}$$

$$n_g = c\frac{\partial k}{\partial \omega} = n_{\text{eff}} - \lambda(dn_{\text{eff}}/d\lambda)$$

where $D_g$ is grating tooth spacing, $\Theta_i$ is the input incidence angle, $\Theta_d$ is the output diffraction angle, m is diffraction order, $\lambda$ is wavelength of the light, $n_{\text{eff}}$ is the effective index refraction of the waveguide (e.g., silicon slab waveguide), and $n_g$ is the group index of the wavelength dispersion of the slab waveguide. In embodiments, the echelle grating comprises a series of linear or curved micro mirrors arranged on a curved line, in a way that provides constructive interference and focusing for the target wavelength at the output (input) waveguide. By properly correcting the aberration through adjustment of the echelle grating surface, the echelle gratings can be constructed using different focusing geometries such as Roland circle or ellipse geometry. In both cases, mirror centers are determined based on the grating equation. In FIG. 3, for example, the light emitted from the input waveguide diffracts and propagates in the slab regions to the distance where the echelle grating grooves are located, e.g., the blazed grating zone (e.g., 388). Accordingly, in embodiments, an echelle grating reflective surface includes grating grooves arranged according to an elliptical or Roland circle focusing geometry to receive and/or reflect the propagating light at a substantially uniform phase wavefront at the echelle grating reflective surface. Note that in embodiments, the narrower the blazed grating zone, the more uniform the phase wavefront, resulting in higher grating efficiency and less sensitivity to etched sidewall impairments.

In embodiments, the grating grooves are shaped or curved to match or correspond the grating grooves to the input or output waveguide that includes one or more segments tapered according to a curve. Embodiments include adjusting or shaping a surface of the grating grooves or teeth to achieve the uniform wavefront. In embodiments, this may include adjusting a groove spacing, a step width, or a step height of the teeth of the grating teeth or grooves to conform a reflective surface to the phase wavefront.

Note that various operations related to FIG. 12 are described as multiple discrete operations in turn, in a manner that is most helpful in understanding the claimed subject matter. However, the order of description should not be construed as to imply that these operations are necessarily order dependent.

Figure 13:
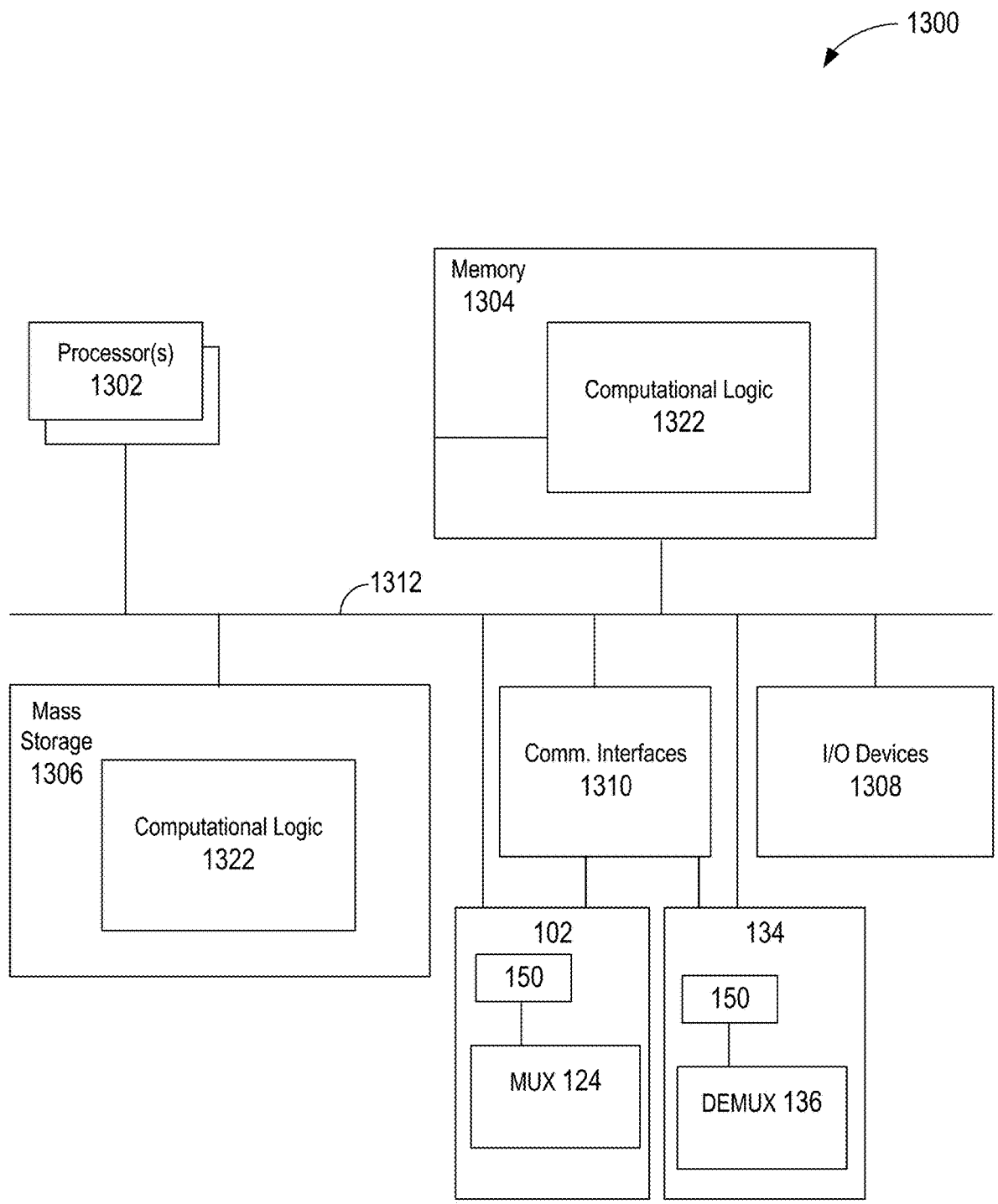
FIG. 13 illustrates an example computing device suitable for use with various components of an optoelectronic system, such as a transmitter having a multiplexer with an input waveguide and/or an output waveguide and mirror and/or receiver having a demultiplexer with an input waveguide and/or an output waveguide and mirror, in accordance with various embodiments.

FIG. 13 illustrates an example computing device 1300 suitable for use with various components of FIG. 1, such as optoelectronic system 100 including transmitter 102 having the multiplexer 124 with the echelle grating mirror 150 and/or receiver 134 having the demultiplexer 136 with the mirror 150, in accordance with various embodiments. As shown, computing device 1300 may include one or more processors or processor cores 1302 and system memory 1304. For the purpose of this application, including the claims, the terms "processor" and "processor cores" may be considered synonymous, unless the context clearly requires otherwise. The processor 1302 may include any type of processors, such as a central processing unit (CPU), a microprocessor, and the like. The processor 1302 may be implemented as an integrated circuit having multi-cores, e.g., a multi-core microprocessor. The computing device 1300 may include mass storage devices 1306 (such as diskette, hard drive, volatile memory (e.g., dynamic random-access memory (DRAM), compact disc read-only memory (CD-ROM), digital versatile disk (DVD), and so forth). In general, system memory 1304 and/or mass storage devices 1306 may be temporal and/or persistent storage of any type, including, but not limited to, volatile and non-volatile memory, optical, magnetic, and/or solid state mass storage, and so forth. Volatile memory may include, but is not limited to, static and/or dynamic random-access memory. Non-volatile memory may include, but is not limited to, electrically erasable programmable read-only memory, phase change memory, resistive memory, and so forth.

The computing device 1300 may further include input/output (I/O) devices 1308 (such as a display (e.g., a touchscreen display), keyboard, cursor control, remote control, gaming controller, image capture device, and so forth) and communication interfaces 1310 (such as network interface cards, modems, infrared receivers, radio receivers (e.g., Bluetooth), and so forth). In some embodiments, the communication interfaces 1310 may include or otherwise be coupled with the transmitter 102 having the multiplexer 124 with the echelle grating mirror 150 and/or receiver 134 having the demultiplexer 136 with the mirror 150 as described herein, in accordance with various embodiments.

The communication interfaces 1310 may include communication chips (not shown) that may be configured to operate the device 1300 in accordance with a Global System for Mobile Communication (GSM), General Packet Radio Service (GPRS), Universal Mobile Telecommunications System (UMTS), High Speed Packet Access (HSPA), Evolved HSPA (E-HSPA), or Long-Term Evolution (LTE) network. The communication chips may also be configured to operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chips may be configured to operate in accordance with Code Division Multiple Access (CDMA), Time Division Multiple Access (TDMA), Digital Enhanced Cordless Telecommunications (DECT), Evolution-Data Optimized (EV-DO), derivatives thereof, as well as any other wireless protocols that are designated as 3G, 4G, 5G, and beyond. The communication interfaces 1310 may operate in accordance with other wireless protocols in other embodiments.

The above-described computing device 1300 elements may be coupled to each other via system bus 1312, which may represent one or more buses. In the case of multiple buses, they may be bridged by one or more bus bridges (not shown). Each of these elements may perform its conventional functions known in the art. In particular, system memory 1304 and mass storage devices 1306 may be employed to store a working copy and a permanent copy of the programming instructions for the operation of the transmitter 102 of FIG. 1. The various elements may be implemented by assembler instructions supported by processor(s) 1302 or high-level languages that may be compiled into such instructions.

The permanent copy of the programming instructions may be placed into mass storage devices 1306 in the factory, or in the field, through, for example, a distribution medium (not shown), such as a compact disc (CD), or through communication interface 1310 (from a distribution server (not shown)). That is, one or more distribution media having an implementation of the agent program may be employed to distribute the agent and to program various computing devices.

The number, capability, and/or capacity of the elements 1308, 1310, 1312 may vary, depending on whether computing device 1300 is used as a stationary computing device, such as a set-top box or desktop computer, or a mobile computing device, such as a tablet computing device, laptop computer, game console, or smartphone. Their constitutions are otherwise known, and accordingly will not be further described.

In embodiments, memory 1304 may include computational logic 1322 configured to practice aspects of embodiments, such as operation of the transmitter 102 and/or receiver 134, as described in reference to FIGS. 1-3. For one embodiment, at least one of processors 1302 may be packaged together with computational logic 1322 configured to practice aspects of optical signal transmission and receipt described herein to form a System in Package (SiP) or a System on Chip (SoC).

The computing device 1300 may include or otherwise be associated with an optoelectronic system, such as system 100 implementing aspects of the transmitter 102 and/or receiver 134, including the multiplexer 124 and/or demultiplexer 136 as described above. In some embodiments, at least some components of the optoelectronic system 100 (e.g., transmitter 102 and/or receiver 134) may be communicatively coupled with the computing device 1300 and/or be included in one or more of the computing device 1300 components, such as communication interfaces 1310, for example.

In various implementations, the computing device 1300 may comprise one or more components of a data center, a laptop, a netbook, a notebook, an ultrabook, a smartphone, a tablet, a personal digital assistant (PDA), an ultra mobile PC, a mobile phone, or a digital camera. In further implementations, the computing device 1300 may be any other electronic device that processes data.

According to various embodiments, the present disclosure describes a number of examples.

Example 1 is an optical apparatus comprising a mirror having an echelle grating reflective surface to reflect and refocus light propagating from a light source; an input optical waveguide to spatially disperse the propagating light onto the mirror; and an output optical waveguide disposed to receive at least a portion of light reflected by the mirror, wherein at least one of the input optical waveguide or the output optical waveguide includes one or more waveguide segments tapered according to a curve to respectively, spatially disperse the propagating light along a substantially uniform phase wavefront at the echelle grating reflective surface or, to receive a portion of light from a substantially uniform phase wavefront reflected from the echelle grating reflective surface.

Example 2 is the optical apparatus of Example 1, wherein the mirror, input optical waveguide, and the output optical waveguide are disposed in a semiconductor layer and the one or more waveguide segments tapered according to the curve includes one or more waveguide segments tapered according to a quadratic function, a parabolic function, or an exponential function.

Example 3 is the optical apparatus of Example 2, wherein a taper length of the one or more waveguide segments is between 10-200 micrometers.

Example 4 is the optical apparatus of Example 2, wherein the echelle grating reflective surface of the mirror includes grating grooves arranged according to an elliptical or Roland circle focusing geometry to correspond to the at least one or more waveguide segments tapered according to the curve to receive and/or reflect the propagating light at a substantially uniform phase wavefront at the echelle grating reflective surface.

Example 5 is the optical apparatus of Example 4, wherein the grating grooves arranged to correspond to the one or more tapered waveguide segments includes grating grooves shaped to correspond to the one or more waveguide segments to achieve the substantially uniform phase wavefront.

Example 6 is the optical apparatus of Example 5, wherein the one or more waveguide segments comprise multiple waveguide segments including a first and a second consecutive segment and wherein the first and/or the second segment is tapered according to a quadratic, parabolic, exponential, or linear function.

Example 7 is the optical apparatus of Example 6, wherein the input optical waveguide or the output optical waveguide further comprises a third consecutive segment tapered according to a quadratic, parabolic, exponential, or linear function.

Example 8 is the optical apparatus of Example 1, wherein the input optical waveguide includes the at least one or more waveguide segments tapered according to the curve and grating grooves of the mirror are arranged to, in conjunction with the input optical waveguide to form a beam path length consistent with receiving the propagating light at a substantially uniform phase wavefront at the grating grooves of the mirror.

Example 9 is the optical apparatus of Example 1, wherein the output optical waveguide includes the at least one of the waveguide segments tapered according to the curve and the grating grooves of the mirror are arranged to, in conjunction with the at least one waveguide segment, to form a beam path length consistent with reflecting the propagating light from a substantially uniform phase wavefront to focus the propagating light at an output focus point associated with the output optical waveguide.

Example 10 is the optical apparatus of any one of Examples 1-9, wherein the echelle grating reflective surface of the mirror includes grating grooves arranged provide substantially total internal reflection of light by the mirror with respect to a position of the input and output optical waveguides.

Example 11 is the optical apparatus of any one of Examples 1-9, wherein the mirror, input optical waveguide, and the output optical waveguide are disposed in a semiconductor layer and the input optical waveguide and the output optical waveguide comprise one or more of a rib waveguide, strip waveguide, or a channel waveguide structure.

Example 12 is a method, comprising: disposing an input optical waveguide in a semiconductor layer to propagate light to spatially disperse the light onto a mirror having an echelle grating reflective surface; and disposing an output optical waveguide inside the semiconductor layer to receive at least a portion of light that is reflected by the mirror; wherein at least one of the input optical waveguide or the output optical waveguide includes at least one waveguide segment tapered according to a curve to respectively, assist the at least one input optical waveguide to spatially disperse the propagating light along a substantially uniform phase wavefront at the echelle grating reflective surface or to receive, by the at least one output optical waveguide, a portion of light reflected from a substantially uniform phase wavefront of the echelle grating reflective surface.

Example 13 is the method of Example 12, wherein the waveguide segment tapered according to the curve includes at least one waveguide segment tapered according to a quadratic, parabolic, or exponential function.

Example 14 is the method of Example 12, wherein the waveguide segment tapered according to the curve is proximate to or followed by at least one waveguide segment tapered according to a linear function.

Example 15 is the method of Example 12, further comprising providing the mirror in the semiconductor layer, wherein the mirror includes an echelle grating reflective surface that includes grating grooves arranged according to an elliptical or Roland circle focusing geometry to receive and/or reflect the propagating light at a substantially uniform phase wavefront at the echelle grating reflective surface.

Example 16 is the method of Example 12, wherein disposing the optical output waveguide inside the semiconductor layer includes determining beam path lengths that form a desired or consistent interference path length of each light beam at a corresponding grating tooth of the echelle grating reflective surface.

Example 18 is the method of Example 12, wherein the propagating light is totally reflected from the echelle grating surface Example 19 is the method of any one of Examples 12-17, further comprising determining a beam path length consistent with a focusing point of the input optical waveguide or a focusing point of the output optical waveguide and a substantially uniform phase wavefront at the echelle grating reflective surface.

Example 20 is an optical communication system comprising at least one optical apparatus, wherein the optical apparatus includes a mirror disposed inside a semiconductor layer to propagate light from a light source, and having an echelle grating reflective surface to reflect and refocus the propagating light; an input optical waveguide disposed inside the semiconductor layer to spatially disperse the propagating light onto the mirror; and an output optical waveguide disposed inside the semiconductor layer to receive at least a portion of light reflected by the mirror, wherein at least one of the input optical waveguide or the output optical waveguide includes a waveguide segment tapered according to a curve to respectively, assist the at least one input optical waveguide to spatially disperse the propagating light along a substantially uniform phase wavefront at the echelle grating reflective surface or to assist the at least one output optical waveguide, to receive a portion of light reflected from a substantially uniform phase wavefront from the echelle grating reflective surface.

Example 21 is the optical communication system of Example 20, wherein the optical apparatus includes a multiplexer and the input optical waveguide comprises multiple input optical waveguides and wherein the output optical waveguide includes one waveguide and wherein the optical communication system comprises a transmitter.

Example 22 is the optical communication system of Example 20, wherein the optical apparatus includes a demultiplexer and the input optical waveguide includes one waveguide and the output optical waveguide includes multiple output optical waveguides and wherein the optical communication system comprises a receiver.

Example 23 is the optical communication system of Example 20, wherein the optical communication system comprises an optical transceiver including the at least one optical apparatus and wherein the one or more waveguide segments tapered according to the curve includes one or more waveguide segments tapered according to a quadratic function, a parabolic function, or an exponential function.

Example 24 is the optical communication system any one of Examples 20-23, wherein the mirror, input optical waveguide, and the output optical waveguide are disposed in a semiconductor layer and the one or more waveguide segments tapered according to the curve includes one or more waveguide segments tapered according to a quadratic function, a parabolic function, or an exponential function.

Example 25 is the optical communication system of any one of Examples 20-23, wherein the echelle grating reflective surface includes grating grooves arranged to correspond to the one or more tapered waveguide segments to achieve the substantially uniform phase wavefront.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated implementations, including what is described in the Abstract, is not intended to be exhaustive or to limit the embodiments of the present disclosure to the precise forms disclosed. While specific implementations and examples are described herein for illustrative purposes, various equivalent modifications are possible within the scope of the present disclosure, as those skilled in the relevant art will recognize.

These modifications may be made to embodiments of the present disclosure in light of the above detailed description. The terms used in the following claims should not be construed to limit various embodiments of the present disclosure to the specific implementations disclosed in the specification and the claims. Rather, the scope is to be determined entirely by the following claims, which are to be construed in accordance with established doctrines of claim interpretation.

What is claimed is:

1. An optical apparatus comprising:
a mirror having an echelle grating reflective surface to reflect and refocus light propagating from a light source;
an input optical waveguide to spatially disperse the propagating light onto the mirror; and
an output optical waveguide disposed to receive at least a portion of light reflected by the mirror, wherein at least one of the input optical waveguide or the output optical waveguide includes one or more waveguide segments tapered according to a curve to respectively, spatially disperse the propagating light along a substantially uniform phase wavefront at the echelle grating reflective surface or to receive a portion of light from a substantially uniform phase wavefront reflected from the echelle grating reflective surface;
wherein the at least one input optical waveguide to include the at least one or more waveguide segments tapered according to the curve and grating grooves of the mirror are arranged to, in conjunction with the input optical waveguide, form a beam path length consistent with receiving the propagating light at the substantially uniform phase wavefront at the grating grooves of the mirror.

2. The optical apparatus of claim 1, wherein the mirror, the input optical waveguide, and the output optical waveguide are disposed in a semiconductor layer and the one or more waveguide segments tapered according to the curve include one or more waveguide segments tapered according to a quadratic function, a parabolic function, or an exponential function.

3. The optical apparatus of claim 2, wherein a taper length of the one or more waveguide segments is between 10 and 200 micrometers.

4. The optical apparatus of claim 2, wherein the echelle grating reflective surface of the mirror includes grating grooves arranged according to an elliptical or Roland circle focusing geometry to correspond to the at least one or more waveguide segments tapered according to the curve to receive and/or reflect the propagating light at a substantially uniform phase wavefront at the echelle grating reflective surface.

5. The optical apparatus of claim 4, wherein the grating grooves arranged to correspond to the one or more tapered waveguide segments includes grating grooves shaped to correspond to the one or more waveguide segments to achieve the substantially uniform phase wavefront.

6. The optical apparatus of claim 5, wherein the one or more waveguide segments comprise multiple waveguide segments including a first and a second consecutive segment and wherein the first and/or the second segment is tapered according to a quadratic, parabolic, exponential, or linear function.

7. The optical apparatus of claim 6, wherein the input optical waveguide or the output optical waveguide further comprises a third consecutive segment tapered according to a quadratic, parabolic, exponential, or linear function.

8. The optical apparatus of claim 1, wherein the output optical waveguide includes the at least one of the waveguide segments tapered according to the curve and the grating grooves of the mirror are arranged to, in conjunction with the at least one waveguide segment, form a beam path length consistent with reflecting the propagating light from a substantially uniform phase wavefront to focus the propagating light at an output focus point associated with the output optical waveguide.

9. The optical apparatus of claim 1, wherein the echelle grating reflective surface of the mirror includes grating grooves arranged to provide substantially total internal reflection of light by the mirror with respect to a position of the input and output optical waveguides.

10. The optical apparatus of claim 1, wherein the mirror, the input optical waveguide, and the output optical waveguide are disposed in a semiconductor layer and the input optical waveguide and the output optical waveguide comprise one or more of a rib waveguide, a strip waveguide, or a channel waveguide structure.

11. A method, comprising:
disposing an input optical waveguide in a semiconductor layer to propagate light to spatially disperse the light onto a mirror having an echelle grating reflective surface; and
disposing an output optical waveguide inside the semiconductor layer to receive at least a portion of light that is reflected by the mirror;
wherein at least one of the input optical waveguide or the output optical waveguide includes at least one waveguide segment tapered according to a curve to respectively assist the at least one input optical waveguide to spatially disperse the propagating light along a substantially uniform phase wavefront at the echelle grating reflective surface or to receive, by the at least one output optical waveguide, a portion of light reflected from the substantially uniform phase wavefront of the echelle grating reflective surface, and
wherein the at least one input optical waveguide to include the at least one or more waveguide segments tapered according to the curve and grating grooves of the mirror are arranged to, in conjunction with the input optical waveguide, form a beam path length consistent with receiving the propagating light at the substantially uniform phase wavefront at the grating grooves of the mirror.

12. The method of claim 11, wherein the waveguide segment tapered according to the curve includes at least one waveguide segment tapered according to a quadratic, parabolic, or exponential function.

13. The method of claim 11, wherein the waveguide segment tapered according to the curve is proximate to or followed by at least one waveguide segment tapered according to a linear function.

14. The method of claim 11, further comprising providing the mirror in the semiconductor layer, wherein the mirror includes an echelle grating reflective surface that includes grating grooves arranged according to an elliptical or Roland circle focusing geometry to receive and/or reflect the propagating light at a substantially uniform phase wavefront at the echelle grating reflective surface.

15. The method of claim 14, further comprising determining a beam path length consistent with a focusing point of the input optical waveguide or a focusing point of the output optical waveguide and a substantially uniform phase wavefront at the echelle grating reflective surface.

16. An optical communication system comprising at least one optical apparatus, wherein the optical apparatus includes:
a mirror disposed inside a semiconductor layer to propagate light from a light source, and having an echelle grating reflective surface to reflect and refocus the propagating light;
an input optical waveguide disposed inside the semiconductor layer to spatially disperse the propagating light onto the mirror; and an output optical waveguide disposed inside the semiconductor layer to receive at least a portion of light reflected by the mirror, wherein at least one of the input optical waveguide or the output optical waveguide includes a waveguide segment tapered according to a curve to respectively assist the at least one input optical waveguide to spatially disperse the propagating light along a substantially uniform phase wavefront at the echelle grating reflective surface or to assist the at least one output optical waveguide, to receive a portion of light reflected from a substantially uniform phase wavefront from the echelle grating reflective surface wherein the at least one input optical waveguide to include the at least one or more waveguide segments tapered according to the curve and grating grooves of the mirror are arranged to, in conjunction with the input optical waveguide, form a beam path length consistent with receiving the propagating light at a substantially uniform phase wavefront at the grating grooves of the mirror.

17. The optical communication system of claim 16, wherein the optical apparatus includes a multiplexer and the input optical waveguide comprises multiple input optical waveguides and wherein the output optical waveguide includes one waveguide and wherein the optical communication system comprises a transmitter.

18. The optical communication system of claim 16, wherein the optical apparatus includes a demultiplexer and the input optical waveguide includes one waveguide and the output optical waveguide includes multiple output optical waveguides and wherein the optical communication system comprises a receiver.

19. The optical communication system of claim 18, wherein the optical communication system comprises an optical transceiver including the at least one optical apparatus and wherein waveguide segment tapered according to a curve includes one or more waveguide segments tapered according to a quadratic function, a parabolic function, or an exponential function.

* * * * *